United States Patent [19]

Collings et al.

[11] Patent Number: 5,501,868
[45] Date of Patent: Mar. 26, 1996

[54] EXTRUDED DOG TREAT FOOD PRODUCT HAVING IMPROVED RESISTANCE TO BREAKAGE

[75] Inventors: George F. Collings, Auburn; Neil P. Stout, Topeka; Christopher S. Cowell, Topeka; Stephen J. Plas, Topeka, all of Kans.

[73] Assignee: Colgate Palmolive Company, Piscataway, N.J.

[21] Appl. No.: 124,911

[22] Filed: Sep. 21, 1993

[51] Int. Cl.⁶ .................................................. A23K 1/18
[52] U.S. Cl. .................. 426/623; 426/446; 426/448; 426/465; 426/635; 426/805
[58] Field of Search ............................. 426/805, 623, 426/630, 635, 448, 516, 74, 446, 465

[56] References Cited

U.S. PATENT DOCUMENTS

| | | | |
|---|---|---|---|
| 3,119,691 | 1/1964 | Ludington | 426/805 |
| 3,615,677 | 10/1971 | Scharschmidt | 426/557 |
| 3,882,257 | 5/1975 | Cagle | 426/805 |
| 4,020,187 | 4/1977 | McCulloch et al. | 426/72 |
| 4,039,689 | 8/1977 | Bone | 426/623 |
| 4,143,169 | 6/1979 | Skoch et al. | 426/307 |
| 4,162,336 | 7/1979 | Brown | 426/805 |
| 4,294,857 | 10/1981 | Fuller | 426/805 |
| 4,310,558 | 12/1982 | Nahm et al. | 426/98 |
| 4,419,372 | 12/1983 | Greene | 426/805 |

FOREIGN PATENT DOCUMENTS

| | | |
|---|---|---|
| 1172092 | 7/1984 | Canada . |
| 0575021 | 12/1993 | European Pat. Off. . |
| 2204049 | 8/1972 | Germany . |
| 2604917 | 10/1976 | Germany . |

OTHER PUBLICATIONS

Patent Abstracts of Japan vol. 12, No. 312 (C–523) 24 Aug. 1988 & JP–A–63 084 451 (Nippon Pet Sangyo KK) 15 Apr. 1988.

Schornmuller Josef, Lehrbuch der Lebensmittelchemie 1974, Springer–Verlag, Berlin Heidelberg, New York pp. 279, 280 "Trocknung der Lebensmittel" p. 280, first full paragraph.

National Research Council, "Nutrient Requirements of Dogs" (1985) National Academy Press, Washington D.C. pp. 46–57.

Primary Examiner—Michael W. Ball
Assistant Examiner—Daniel J. Stemmer
Attorney, Agent, or Firm—Paul Shapiro; Robert C. Sullivan

[57] ABSTRACT

A dog treat food product is disclosed which is extruded from a nutritionally balanced mixture of carbohydrate, protein, fat, vitamins and minerals. The dog treat food product exhibits improved resistance to breakage on impact by drying pieces of the extrudate under controlled conditions of humidity to a moisture level of between 6–10% by weight at a relative humidity of about 5 to about 25%, a dry bulb temperature of about 150° to about 250° F., a wet bulb temperature of about 105° to about 150° F. and for at least 15 minutes.

7 Claims, 1 Drawing Sheet

EXTRUDED DOG TREAT FOOD PRODUCT HAVING IMPROVED RESISTANCE TO BREAKAGE

BACKGROUND OF THE INVENTION

1. Field of Invention

This invention relates to an extruded dog food product and in particular to an extruded dog food product having improved resistance to breakage on shipping and handling.

2. Prior Art

The nutrition and health of dogs is one of the most important aspects of pet care. Most dog owners wish to provide their dogs a well-balanced and healthy diet. As people are becoming much more aware of their own personal nutrition, there is an increased awareness in the importance of providing balanced nutrition in the form of pet food and pet treats.

Dogs should be fed a balanced diet combining water, proteins, carbohydrates, fats, minerals and vitamins. Pet owners routinely treat their dogs with a variety of snack foods made for this purpose. Many of these snack foods are not nutritionally balanced for a particular life stage. It is therefore proposed to provide a canine food product that the pet owner can give to his dog as a treat while maintaining the balance of nutrients necessary for good health.

In copending patent application Ser. No. 07/899,534 filed Jun. 16, 1992, now U.S. Pat. No. 5,431,927, there is disclosed an extruded animal food product having an expanded, striated structural matrix which when chewed by the animal effectively removes tartar, strain and plaque from the animals' teeth through a mechanical cleansing action. The extruded expanded food product has a low moisture content and is formed from an ingredient mixture of carbohydrate, fat, protein and fiber-bearing ingredients and nutritional balancing ingredients such as vitamins and minerals.

In preparing the pet food product of U.S. Pat. No. 5,431,927, the ingredient mixture is formed into pieces by moving the mixture under plasticizing mechanical agitation and increasing levels of temperature and shear to form a flowable mass which is advanced through a die of predetermined diameter having a coefficient of friction no greater than 0.2 to form a continuous strand of product in an expanded and stratified condition. The product when formed into pieces exhibits strong structural integrity and is not subject to breakage on handling.

When it was attempted to adapt the composition and process conditions of U.S. Pat. No. 5,431,927, to the manufacture of a dog treat food product, that is, a product that was not in a stratified condition, it was determined that the extruded, expanded dog treat product did not have sufficient structural integrity to withstand breakage due to drop impact, i.e., the product could not satisfactorily withstand the impacting internal pressure when the container in which the dog treat product was packaged was dropped during handling and use. Drop impact tests performed on the dog treat product packaged in cardboard canisters i.e., the number of broken pieces as represented as a percentage of total weight, indicated an unacceptable breakage rate, i.e. greater than 10%, and as high as 60–80%.

Therefore, there is a need in the pet food field for a nutritive, extruded dog food treat product which exhibits resistance to breakage when packaged and handled.

SUMMARY OF THE INVENTION

The present invention is directed to a process for the manufacture of an extruded dog treat food product which exhibits strong structural integrity and is resistant to breakage; wherein an ingredient mixture of carbohydrate, fat, protein, and nutritional balancing ingredients such as vitamins and minerals are extruded as a continuous strand of shaped product in an expanded condition. The strand of expanded product is segmented into discrete pieces or chips upon exit of the strand from the extruder. The pieces are then dried in moisturized heated air, and the final moisture content of the product reduced to about 6 to about 10% by weight, in an atmosphere of about 5 to 25% relative humidity, a dry bulb temperature of about 150° to about 250° F., and a wet bulb temperature of about 105° to about 150° F., the pieces being exposed to these drying conditions for at least 15 minutes.

The extruded food product of the present invention is a solid, uniform, expanded composition. When tested for breakage in drop impact tests, the % breakage is in the range of about 4–6%. In a preferred embodiment of the invention, fiber-bearing ingredients are included in the ingredient mixture from the expanded dog treat food product is prepared. Extruded dog treat food products containing about 2 to about 10% by weight of fiber-bearing ingredients exhibit drop impact breakage levels of less than 3%.

DESCRIPTION OF THE PREFERRED EMBODIMENTS

Figure 1:
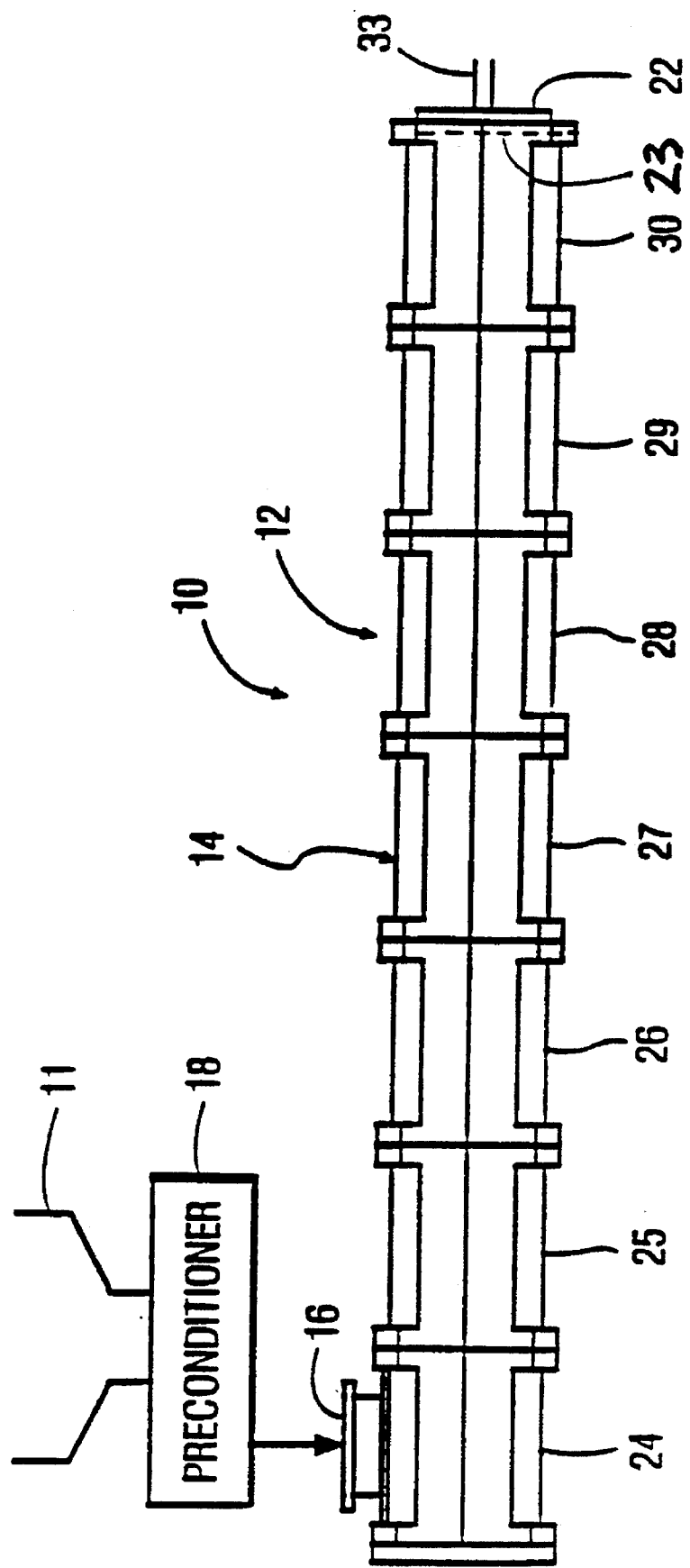
FIG. 1 is a schematic representation of an extrusion system used to manufacture the dog treat food product of the present invention.

This invention is described in conjunction with the accompanying drawing in which FIG. 1 is a schematic presentation of an extrusion system used to manufacture the dog treat food product of the present invention The extruded expanded product of the present invention has a typical nutritional content as follows:

| Ingredient | % by Weight |
| --- | --- |
| Carbohydrate | about 20 to about 70 |
| Protein | about 12 to about 30 |
| Fat | about 3 to about 20 |
| Nutritional balancing agents (vitamins and minerals) | about 0.5 to about 5 |

Suitable ingredients which may be used to prepare the extruded food product of the present invention generally contain substantial amounts of animal protein derived from protein sources such as poultry by-products and whole dried eggs; fiber derived from beet pulp, soy mill run and purified cellulose; carbohydrates provided by carbohydrate sources such as cereals and grains such as wheat, corn and rice; and fats derived from fat sources such as choice white grease and vegetable oil. Small amounts of vitamins, mineral salts, flavorings, colorants and preservatives are also generally included in the food product of the present invention to provide nutritional balance and palatability. A preferred dog treat food product dried in accordance with the process of the present invention is prepared from a mixture of the following ingredients:

| Ingredient | % by Weight |
| --- | --- |
| Corn (Ground) | 40–70 |

-continued

| Ingredient | % by Weight |
| --- | --- |
| Cellulose Fiber | 2–10 |
| Poultry By-product Meal | 20–30 |
| White Grease | 1–10 |
| Inorganic Salts ((NaCl, KCl, CaCO$_3$) | 0.5–2.0 |
| Vitamins | 0.01–0.2 |
| Trace Minerals | 0.01–0.2 |
| Preservative | 0.01–0.2 |

In preparing the extruded, expanded dog treat product of the present invention, the mixture of ingredients selected to yield a nutritionally balanced diet is mixed and preconditioned (or moisturized within a preconditioner or mixing cylinder) wherein the ingredients are contacted with steam and moisture. The moisturized mixture is then introduced into the preconditioner of a heatable extruder having one or more helical transfer screws axially rotatable within a closed heatable barrel and equipped with a restricted extrusion discharge passageway such as a die at the front end of the barrel.

In the pre-conditioner, the mixture of ingredients is subjected to steam and moisture in order to adjust the moisture content of the mixture to between about 15 and 30% by weight. The moisture conditioned mixture is then mixed and advanced through the barrel of the extruder by the axially rotating screws which plasticize the mixture. The advancing mass builds up sufficient shear to cause the plasticized mixture to form a flowable mass to be advanced at the desired temperature, e.g., 100°–250° F., and pressure e.g., 100 to 1000 psi through a shaped die mounted at the front end of the extruder barrel. The plasticizing combination of temperature shear and pressure subjects the mixture to compression and temperature sufficiently high so that it is cooked or gelatinized as it advances through the extruder barrel.

As the food product of the present invention is extruded from the die, the moisture in the extrudate is in a superheated state and flashes to steam when the extrudate leaving the die has the compression suddenly relieved whereby the escaping steam swells and expands the extrudate. This extrudate exits the die in the form of a thick strand of expanded mass which is segmented into pieces or chips by rotating knives or other cutting means. The chips are then dried under carefully controlled conditions of temperature and humidity to obtain a breakage resistant product.

In preparing the final dog treat food product, the final moisture content of the expanded extrudate pieces is an important feature of the present invention. To obtain an acceptable breakage resistant product, the moisture content of the final product is adjusted to the range of about 6 to about 10%. Preferably the moisture content is reduced to about 7 to about 9% by weight. At moisture levels below 6% the product becomes extremely fragile. At moisture levels above about 10%, the risk of mold growth significantly increases.

In the step of drying the extruded food product to achieve the desired final moisture level, the relationship between the drying temperature and the length of time for the drying step, is a critical feature in the manufacture of the dog treat product of the present invention. Thus, the drying process used to obtain the final moisture level in the dog treat product requires extremely careful control of the temperature and humidity and must be done relatively slowly in order to produce a product of satisfactory breakage resistance. If the drying is carried out too quickly, i.e., at too high a temperature, e.g. above about 250° F., the dried pieces or chips of extruded product will be fragile and exhibit high breakage rates. Drying carried out too quickly, will "case harden" the extruded chips creating internal microfissures which render the product vulnerable to fragmentation along the microfissure lines.

To reduce the moisture content of the extruded chips, the chips are dried in a dryer, e.g. a hot air humidity controlled circulating oven adjusted to a relative humidity of about 5 to about 25%. Relative humidity (RH) is defined in a standard manner as the ratio of vapor pressure in the air to the saturation vapor pressure at the same temperature and is expressed as %. These conditions of relative humidity are achieved at dry bulb temperatures in the range of about 150° to about 250° F. and wet bulb temperatures of about 105° to about 150° F., and preferably a dry bulb temperature in the range of about 160° to about 210° F. and a wet bulb temperature in the range of about 110° to about 130° F.

To advantageously accomplish drying of the extruded dog treat product of the present invention at a relative humidity within the range of about 5 to about 25% and a dry bulb temperature of about 150° to 250° F. and a wet bulb temperature of 105° to 150° F., the product is exposed to these drying conditions for a period of at least about 15 minutes and preferably about 20 to about 120 minutes and most preferably about 45 to about 90 minutes.

In FIG. 1, there is shown one embodiment of an extrusion apparatus 10 which can be used to manufacture the extruded, expanded food product of the present invention. The extrusion apparatus 10 includes an extruder 12 having a barrel 14 with an inlet 16 located below the outlet of a preconditioner 18; the extruder 12 also having an outlet equipped with a die section 22. Hopper 11 is provided to pre-mix the ingredients prior to preconditioning. The barrel 14, as depicted, comprises seven barrel sections 24, 25, 26, 27, 28, 30, although the number of barrels may vary without departing from the principles of the present invention. The barrel sections are interconnected to present an elongated bore through the barrel 14 of the extruder 12. Two co-rotating, flighted material advancing screws (not shown) are received in the bore of the barrel and are intermeshed along the majority of the length of the extruder barrel 14 and terminate in the die section 22. The screws feed material to and through the extruder assembly, including the die 22, at an appropriate velocity. A spacer ring 23 is inserted between the terminal end of the rotating screws (not shown) and the adjacent face of the die 22. The spacer ring 23 provides a small surge area to dampen the effects of the twin screws so that the flow of plasticized mass is more even. Extrusion apparatus 10 of the type illustrated in FIG. 1 is available from the Wenger Manufacturing Company such as the Wenger TX52 Twin Screw Extruder. The pre-conditioner 18 shown in FIG. 1 is also manufactured by Wenger Manufacturing, Inc.

In preparing the expanded, extruded dog treat product of the present invention, the ingredients from which the dog treat is extruded are first mixed in a mixer such as a ribbon mixer and fed to hopper 11. These ingredients include protein materials such as poultry by-product meal; carbohydrates such as ground yellow corn and vitamin mix and mineral mix. In a preferred embodiment a fiber bearing ingredient such as beet pulp or cellulose fiber, is included in the ingredient mixture. The mixed ingredients are metered to the preconditioner 18 and admixed with fats such as white grease which are fed directly into the preconditioner 18 at a rate between about 0.4 to 0.6 pounds/minute (lbs./min.). In the preconditioner 18, the mixture of ingredients is fed thereto at a rate between 4 and 10 lbs./min. The temperature of the mixture is raised from ambient to 120° to 212° F. by the injection of steam into the preconditioner 18 at the rate of 0.2 to 0.6 lbs./min. Total residence time in the preconditioner 18 generally ranges from 2 to 15 minutes.

Preconditioning the mixture with steam and water initiates hydration of the carbohydrate and fibrous ingredients which is completed by the mechanical working during the extrusion process. Once the mixture of ingredients and water is introduced into the extruder barrel 14, the mixture is advanced along the length of the barrel 14 by axial rotation of the screws. The mixture is sequentially advanced through the extruder and finally through the die 22. As the dog treat ingredient mixture passes through the barrel sections 24, 25, 26, 27, 28, 29, and 30, it is mixed and cooked. The build-up of plasticized food ingredient mixture transferred to the die 22 by the rotating transfer screws causes pressures of about 50 to about 300 psi to be applied to the mixture at the die opening.

The extrudate strand 33 as it leaves the die 22 has a moisture content of about 15 to about 25% water by weight and preferably about 18 to about 20% water by weight. The extruded strand 33 swells upon exiting the die due to flashing of moisture to steam producing an expanded structure. The strand is cut into 46 to 55 mm lengths of pieces or chips and then placed in an oven and subjected to drying under controlled conditions of humidity e.g., about 5 to about 25% relative humidity at about 150° to about 250° F. (dry bulb) and about 105° to about 150° F. (wet bulb) for at least 15 minutes and generally about 20 to 120 minutes to reduce the moisture level of the chips to about 6 to about 10% moisture.

The invention is further illustrated by the following specific but non-limiting Example.

EXAMPLE

A solid nutritionally balanced dog treat food product designated Composition A having an expanded structural matrix was prepared in accordance with the present invention by first mixing the following ingredients:

| Ingredient | Weight % |
| --- | --- |
| Ground Yellow Corn | 57.385 |
| Poultry By-product Meal | 26.315 |
| Cellulose Fiber | 5.000 |
| Choice White Grease | 5.700 |
| Sodium Chloride | 0.333 |
| Dicalcium Phosphate | 1.710 |
| Potassium Chloride | 0.40 |
| Choline Chloride | 0.095 |
| Vitamin Mix | 0.105 |
| Mineral Mix | 0.033 |
| Iron Oxide | 0.029 |
| Ethoxyquin (Preservative) | 0.019 |

*cellulose fibers of 60 microns average length.

The ingredients (except the choice white grease) were milled through a hammermill having screen size of 3/64 inch and then blended in a ribbon mixer for 2–3 minutes.

The blended mixture was fed to the hopper 11, of a Wenger twin screw extruder (Model No. TX 52) equipped with a preconditioner 18. The Wenger TX 52 extruder was of the type schematically illustrated in FIG. 1 and was provided with two rotatable, flighted material advancing screws and had a total of 7 barrel sections and terminated in a spacer plate die.

The mixture, having a moisture content of 14.5%, was fed to the preconditioner at a rate of 6.5 lbs./min. The mixture was raised in temperature to 190° F. by the injection of steam introduced at a rate of 0.6 lbs./min. into the preconditioner. Water was introduced into the preconditioner at the rate of 0.7 lbs/min. Choice white grease was added to the preconditioner at the rate of 0.4 lbs/min. The preconditioned mixture was fed into the inlet 16 of the extruder feeding zone. The screws of the extruder were rotated at a speed of 450 rpm.

Temperatures of the extruder barrel sections were maintained at 180° F., 190° F., 210° F., 215° F., and 230° F. and 235° F. for the second, third, fourth, fifth, sixth and seventh, barrel sections respectively. The die issued the extrudate in the form of an expanded strand 50.1 mm in length, 25 mm in width and 9 mm in depth. The strand product swelled upon issuing from the die due to moisture in the extrudate flashing to steam. The strand having a moisture content of 18% by weight was cut into 10 mm thick wavy-shaped chips.

The chips were then conveyed to a forced air drying system and the moisture level reduced to 8.8% by weight under controlled conditions of humidity. The dryer was set to a dry bulb reading of 205° F. and a wet bulb reading of 125° F., whereby a relative humidity of 13% was maintained. The extruded product was placed on perforated trays and exposed to these conditions for 45 minutes whereby the final moisture level of 8.8% was achieved.

The dried product was packaged in a sealed, air tight, 5" diameter×8" tall cardboard cylindrical canisters which weighed 500 grams when filled.

After one week storage, the sealed canisters were subjected to a drop test to determine whether the dog treat product could satisfactorily withstand the impacting internal pressure when the canisters containing the dog treat chips were dropped during shipping or handling. In the drop test, 48 sealed canisters containing the dog treat chips were packaged in corrugated boxes (12 per box) and the boxes dropped from a height of three feet, three times in succession. Thereafter, the dog treat chip contents of the canisters were inspected for product damage and the % breakage determined. Percent breakage was determined as the number of broken pieces represented as a percent of total weight of product in each canister. A percent breakage of below 10% was considered acceptable in the drop test.

The procedure of the Example was repeated with the exception that the 5% cellulose fiber content of Composition A was modified by substituting 5% beet pulp (Composition B) or 5% Soy Mill Run (Composition C) as the fiber-bearing ingredient. The results of the drop test are summarized in Table I below.

TABLE I

| Composition | % Breakage | Std. Dev. |
| --- | --- | --- |
| A | 0.78 | 1.3 |
| B | 2.3 | 2.6 |
| C | 2.9 | 2.7 |

The results recorded in Table I indicate that the drop impact breakage of the extruded expanded fiber reinforced dog treat product can be reduced to below 3% by drying the product to a moisture level below 10% at a RH of 13% and a dry bulb/wet bulb temperature of 205°/125° F. for 45 minutes. Packaged dog treat product reinforced with cellulose fiber exhibited the least breakage when dropped.

Example II

The procedure of Example I was repeated to manufacture a dog treat product using the following ingredients:

| Ingredient | wt. % |
| --- | --- |
| Ground Yellow Corn | 60.41 |
| Brewers Rice | 3.00 |
| Poultry By-Product Meal | 27.70 |
| Sodium Chloride | 0.35 |
| Choice White Grease | 6.00 |
| Potassium Chloride | 0.45 |
| Dicalcium phosphate | 1.80 |
| Choline Chloride | 0.10 |
| Vitamin Mix | 0.11 |
| Mineral Mix | 0.035 |
| Iron Oxide | 0.03 |
| Ethoxyquin | 0.02 |

The dog treat food product was dried to moisture levels of 6.0–8.8% at varying R.H. and dry/wet bulb temperatures for varying time periods. The dried dog food treat was then subjected to drop tests of the type described in Example 1 to determine its resistance to breakage. The results are recorded in Table II below.

TABLE II

| Test No. | Final Product Moisture (%) | Dry Bulb/ Wet Bulb Temp (°F.) | RH (%) | Drying Time (Min.) | Breakage % | Std. Dev. |
| --- | --- | --- | --- | --- | --- | --- |
| 1 | 8.7 | 160/112 | 25 | 78 | 3.8 | 2.6 |
| 2 | 8.7 | 205/125 | 13 | 45 | 5.3 | 4.0 |
| 3 | 6.0 | 285/115 | 1.1 | 1.7 | 25.0 | 6.4 |
| 4 | 7.3 | 283/116 | 1.0 | 13 | 25.2 | 10.1 |

The results recorded in Table II show that the extruded expanded dog treat food product in which a fiber bearing ingredient is absent when dried in accordance with the process of the present invention (Test Nos. 1–2) exhibits an impact breakage of about 4–5% whereas the same product (Test Nos. 3–4) dried under temperature, time and RH conditions outside the scope of the present invention exhibited unacceptable (25%) breakage levels.

What is claimed is:

1. A method of preparing a dog treat food product which exhibits reduced physical breakage during shipping and handling which comprises working a food mixture containing about 20 to about 70% by weight carbohydrate, about 12 to about 30% by weight protein, about 3 to about 20% by weight fat and about 0.5 to about 5% by weight nutritional balancing agent ingredients, under mechanical pressure and heat sufficient to convert the mixture to a flowable mass, passing the mass through a die to obtain an expanded extrudate product, segmenting the extrudate into pieces and then drying the pieces to a final moisture content of about 6.0 to about 10.0% by weight in an atmosphere of about 5 to about 25% relative humidity, a dry bulb temperature of about 150° to about 250° F., and a wet bulb temperature of about 105° to about 150° F., the pieces being exposed to these drying conditions for a period of about 20 to about 120 minutes.

2. The method of claim 1 wherein a fiber bearing ingredient is incorporated in the dog treat product.

3. The method of claim 2 wherein the fiber bearing ingredient is cellulose fiber.

4. The method of claim 1 wherein the pieces are dried to a moisture content of about 7 to about 9% by weight.

5. The method of claim 2 wherein the fiber bearing ingredient is incorporated in the food mixture at a concentration of about 2 to about 10% by weight.

6. The method of claim 2 wherein the fiber bearing ingredient is beet pulp.

7. The method of claim 2 wherein the fiber bearing ingredient is soy mill run.

* * * * *